Patented Jan. 27, 1942

2,271,299

UNITED STATES PATENT OFFICE 2,271,299

MANUFACTURE OF CATALYSTS

Vladimir Ipatieff and Herman Pines, Chicago, Ill., assignors to Universal Oil Products Company, Chicago, Ill., a corporation of Delaware No Drawing. Application July 12, 1939,
Serial No. 283,996

13 Claims. (Cl. 252—251)

This invention relates particularly to the manufacture of catalysts useful in various types of organic reactions, including those involving different classes of hydrocarbons.

More specifically, the invention is concerned with the manufacture of composite catalysts in which a catalytically active heavy metal salt, together with a relatively inactive metal salt, is incorporated into a porous granular and adsorptive carrier so that the active ingredient is in effect diluted and so that the particles produced resist disintegration and agglomeration in various types of vapor, liquid, and mixed phase catalytic operations involving organic compounds.

In one specific embodiment the present invention comprises the manufacture of catalysts for use in organic reactions by impregnating relatively inert granular materials with substantially anhydrous aluminum chloride and a relatively inactive metal halide.

The use of aluminum chloride in organic reactions, and particularly in reactions involving the various groups of hydrocarbons is well known in the art. For the sake of indicating certain types of reactions in which the present prepared catalyst can be employed the following brief summary is given of some typical reactions in which aluminum chloride is employed as a catalyst or condensing agent:

1. Aromatic hydrocarbons can be alkylated with alkyl halides according to the following typical equation:

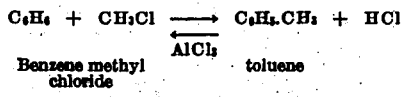

Benzene methyl chloride     toluene

2. In a development of the above reactions an aryl-substituted alkyl halide may be employed as typified by the following equation:

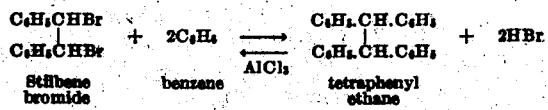

Stilbene bromide    benzene    tetraphenyl ethane

3. Using aromatic hydrocarbons and acid chlorides, ketones can be prepared according to the following typical equation:

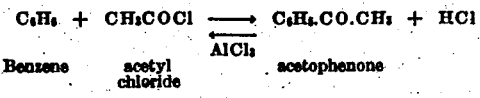

Benzene   acetyl chloride   acetophenone

4. The use of aluminum chloride makes possible the preparation of aldehydes by reacting substituted benzenes with carbon monoxide and hydrogen chloride according to the following simple equation:

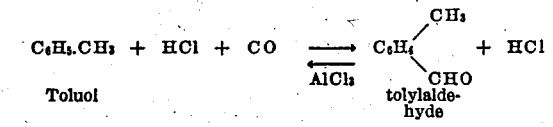

Toluol       tolylaldehyde

5. Organic acids can be prepared from aromatic hydrocarbons by the action of carbonyl chloride upon the aromatic hydrocarbon as shown below:

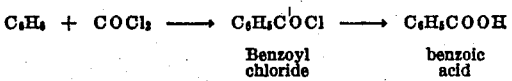

Benzoyl chloride    benzoic acid

By the development of more complicated reactions corresponding in general to those given in Sections 1 and 2, an extensive series of reactions is made possible whereby various types of hydrocarbons may be made to condense and form higher molecular weight products through reactions involving generally a primary halogenation followed by splitting off of the halogen acid and the combination of the resultant radicals. Aluminum chloride is used both as a catalyst in the thermal conversion of relatively heavy petroleum hydrocarbon fractions to produce low boiling gasoline distillates, and also under more moderate conditions of treatment for the purification of these distillates by causing the polymerization of the more reactive olefinic constituents. In the case of complicated hydrocarbon oil mixtures, such as the various fractions produced in the distillation and cracking of petroleum and other hydrocarbon oils it is difficult to follow the exact course of the various reactions which take place when aluminum chloride is employed. However, they may be grouped generally under the terms polymerization alkylation, and condensation. Aluminum chloride is also serviceable in effecting isomerization reactions, such as, for example, the isomerization of hexamethylene to methylcyclopentane, and the isomerization of normal paraffin hydrocarbons into isomeric forms.

It is within the scope of the invention to form a complex catalyst of aluminum chloride and a metal halide supported on a relatively inert granular adsorbent, the metal halide serving in the capacity of a diluent for the aluminum chloride, thereby decreasing the activity of the aluminum chloride, and making it possible to carry out reactions under slightly higher temperatures without getting side products formed, and the support enabling the reactions to be carried out more easily and practically in a continuous operation.

Aluminum chloride, in some instances, is too active as a catalyst to be used in chemical reactions. For instance, in the isomerization of n-pentane to iso-pentane the former undergoes, in many cases, undesirable decomposition when the reaction is catalyzed by means of aluminum chloride-hydrogen chloride catalysts. Whenever aluminum chloride is used, the experimental conditions have to be rigorously controlled.

As one feature of the present invention it is proposed to decrease the violent activity of aluminum chloride by diluting it with a metal halide which in itself has little or no catalytic activity, the amount of the metal halide in proportion to the aluminum chloride depending upon the type of reaction which it is intended to carry out and the activity desired. Among the metal halides suitable for use in the present instance are included the halides of group 1 to 6 inclusive and group 8 of the periodic table in addition to the ammonium halides, the one chosen for a catalyst for a particular reaction depending upon the type of reaction and the temperatures employed. As a further feature of the invention, the aluminum chloride and metal halide are dispersed on a relatively inert granular adsorbent prepared in such manner that the greatest possible surface is exposed to the reaction mixture.

In effecting various reactions among organic compounds utilizing aluminum chloride as a catalyst, difficulty is frequently encountered in that intermediate addition compounds are formed which are more or less of a sticky and viscous character, so that the original granules of anhydrous chloride become coated and the effective catalytic surface is lost. The tendency may be overcome to some extent by employing vigorous agitation during the course of the catalytic reactions, but it can never be entirely obviated, so that in general the full effectiveness of the aluminum chloride is never attained. The yields of reaction products are of such an order that to make operations profitable, the aluminum chloride must be recovered for reuse.

According to the present invention, the above disadvantages are to a large extent overcome by the use of composite granular catalysts, consisting in general of substantially inert porous adsorptive materials impregnated with substantially anhydrous aluminum chloride and a relatively inactive metal halide. Inert granular materials which may be used alternatively but obviously not with exactly equivalent results on account of variations in adsorptive capacity include activated carbons, various silicates and siliceous materials such as fuller's earth, clays, raw and acid treated, diatomaceous and infusorial earths, granular pumice, and crushed porous porcelain. In fact, practically any material which is substantially unreactive with the aluminum chloride and other halides so that the desired stable properties of the catalyst granules are assured, may be employed. Of the supports mentioned, activated carbons, diatomaceous earths, and pumice are particularly serviceable.

Another property of anhydrous aluminum chloride which must be taken into account is its tendency to sublime at a temperature of approximately 180° C. under atmospheric pressures, so that if it is employed at temperatures above this point it must be injected or sublimed into the reaction zone or the reactions must be carried out under pressure.

In the process of the present invention in which the aluminum chloride-metal halide complex is strongly absorbed by granular adsorbents, the disadvantages enumerated are to a large extent overcome as will be shown in the following paragraphs descriptive of the invention, since the tendency of the aluminum chloride to be too active to form a sludge, from which the aluminum chloride must be recovered and to volatilize is counteracted by the fusion with the metal halide and the absorbent action of the granular adsorbents employed, and since these supports apparently act to absorb and retain some of the viscous addition compounds and prevent the composite catalyst granules from adhering to form large agglomerates. Furthermore, the active catalyst on the adsorbent presents a greater surface area to the reaction, hence increasing the yields of reaction products over a given period of time.

Another reason for the use of certain metal halides as diluents for aluminum chloride is because in some instances they form mixtures with the aluminum chloride, the melting points of which mixtures, if the proportions are properly chosen, being below the temperature at which aluminum chloride sublimes and below the melting points of the given metal halides. To illustrate this point, the following tabulation is given showing the melting points of mixtures of metal halides with aluminum chloride in given proportions:

Melting point, °C.
(a) 6 parts anhydrous $AlCl_3$, 3 parts NaCl, and 1 part anhydrous $FeCl_3$_____ 50
(b) $MgCl_2 + AlCl_3$ containing 15.4 mol % $MgCl_2$_____ 186
(c) $LiCl + AlCl_3$ containing 41 mol % NaCl__ 124
(d) $KCl + AlCl_3$ containing 34.5 mol % KCl__ 158

We have found that the above described catalyst composites may be formed by two alternative methods, as follows:

(1) The unactive metal halide may be first added to the adsorbent and the aluminum chloride then added. In this case the adsorbent is saturated with an aqueous solution of the metal halide, dried, and then contacted with aluminum chloride under pressure at a temperature of about 300° C. The adsorbent being porous the metal halide is evenly distributed, and the aluminum chloride immediately forms a low-melting fused mixture with the metal halide and becomes dispersed in a controllably diluted form through the adsorbent.

(2) Aluminum chloride and metal halide in predetermined proper proportions are mixed and heated at varied temperatures under necessary pressures, the conditions depending upon the metal halide used and the ratio of metal halide to aluminum chloride, and the fused mixture formed is contacted with the adsorbent. A uniformly distributed catalyst of aluminum chloride-metal halide supported on the adsorbent is obtained.

Upon examination, the product obtained by either of the above methods of preparation is dry and granular, the aluminum chloride-metal halide apparently having disappeared, though it is actually present in the pores and on the surface of the adsorbent as evidenced by the violent reaction of the granules with water and the catalytic activity in organic reactions.

The invention also comprises the manufacture of aluminum bromide or aluminum iodide catalyst composites, but these are generally less valuable since the bromide and iodide are more expensive for use.

Owing to the adsorptive properties of the adsorbents employed, catalysts of the present character may be used in liquid phase organic reactions with substantially no tendency for the original particles to run together due to the formation of intermediate sludge-like products, so that much larger quantities of material may be treated before the catalyst has lost its activity.

Because the adsorbed aluminum chloride remains in place without volatilization at considerably higher temperatures than its normal sublimation point, when vapors of reacting compounds are passed over a stationary granular bed of catalyst, the above described catalysts may be used in the vapor phase treatment of gasoline boiling range cracked distillates for their refining, either as they are produced at the cracking plant or from rerun stills.

The term "activated carbon" as used in the present specification is intended to include any type of prepared carbon or carbonaceous material which is more or less granular and possessed of good porosity and structural strength and which has been prepared by general steps involving the leaching of adsorbed materials from granular carbonaceous materials such as wood char, and various varieties of coke by mineral acids and by the controlled heating, preferably under vacuum, to expel adsorbed liquids and gases. It is recognized that the various forms of active granular chars will vary considerably in adsorptive capacity so that therefore the properties of catalysts prepared in accordance with the present invention will vary both in respect to the amount of metal halide and aluminum chloride which they are able to absorb and in respect to the periods of service in which they are able to maintain a practical activity in different organic reactions.

It is within the scope of the invention and frequently preferable to utilize the composite consisting of aluminum chloride and a relatively inactive metal halide on inert porous adsorbents as formed particles such as may be made by pilling machines, using any type of substantially unreactive binder to produce structural strength in the pills.

The following example is given to illustrate the present method of manufacturing catalysts for use in various organic reactions without any intent of unduly circumscribing the proper scope of the invention.

24 parts by weight of granular activated carbon was added to a solution in water of 73 parts by weight of sodium chloride, the mixture being evaporated to dryness on a steam bath. After this treatment the apparently dry product was further heated to a temperature of 350° C. to drive off further amounts of adsorbed water. 60 parts by weight of the activated carbon containing the adsorbed sodium chloride was placed in a pressure vessel containing 40 parts by weight of finely divided granular substantially anhydrous aluminum chloride. An equivalent of 9 parts by weight of hydrogen chloride was introduced under pressure and the contents of the vessel were heated for three hours at 300° C. under a hydrogen pressure of approximately 35 atmospheres.

The granular material recovered from the pressure vessel was apparently dry and had a gray color. It was found to be applicable to catalyzing various types of reactions among hydrocarbons, particularly the conversion of normally gaseous olefins into gasoline boiling range materials, the isomerization of normally liquid paraffin hydrocarbons into their corresponding isomeric modifications and various types of alkylation reactions involving the addition of alkyl groups to aromatics, paraffins, and naphthenes.

We claim as our invention:

1. A process for producing catalysts which comprises adding to a solid adsorbent an aqueous solution of a catalytically inactive metal halide, drying the resultant mixture, and then impregnating the mixture with an anhydrous aluminum halide.

2. A process for producing catalysts which comprises adding to a solid adsorbent an aqueous solution of a catalytically inactive metal halide, drying the resultant mixture, and then impregnating the mixture with anhydrous aluminum chloride.

3. A process for producing catalysts which comprises adding to a solid adsorbent an aqueous solution of an alkalinous metal halide, drying the resultant mixture, and then impregnating the mixture with an anhydrous aluminum halide.

4. A process for producing catalysts which comprises adding to a solid adsorbent an aqueous solution of sodium chloride, drying the resultant mixture, and then impregnating the mixture with anhydrous aluminum chloride.

5. A process for producing catalysts which comprises adding to a solid adsorbent an aqueous solution of a catalytically inactive metal halide, drying the resultant mixture, and then impregnating the mixture with anhydrous aluminum chloride at a temperature above the normal sublimation point of aluminum chloride and under superatmospheric pressure.

6. A process for producing catalysts which comprises adding to a solid adsorbent an aqueous solution of a catalytically inactive metal halide, drying the resultant mixture, and then impregnating the mixture with anhydrous aluminum chloride at about 300° C. and under superatmospheric pressure.

7. A process for producing catalysts which comprises adding to a solid adsorbent an aqueous solution of a catalytically inactive metal halide, drying the resultant mixture, and then impregnating the mixture with an anhydrous aluminum halide under temperature and pressure conditions adequate to fuse the aluminum halide with said inactive metal halide.

8. A process for producing catalysts which comprises adding to a solid adsorbent an aqueous solution of a catalytically inactive metal halide, drying the resulting mixture, and then impregnating the mixture with anhydrous aluminum chloride under temperature and pressure conditions adequate to fuse the aluminum chloride with said inactive metal halide.

9. A process for the manufacture of composite granular materials applicable to catalyzing organic reactions which comprises saturating a granular adsorbent with an aqueous solution of a metal halide of relatively low activity selected from the group consisting of the halides of the alkali and alkaline earth metals, drying the mixture, and subsequently adding anhydrous aluminum chloride to said mixture.

10. A process for the manufacture of composite granular materials applicable to catalyzing organic reactions which comprises saturating granular activated carbon with an aqueous solution of a metal halide of relatively low activity selected from the group consisting of the halides of the alkali and alkaline earth metals, drying the mixture, and subsequently adding anhydrous aluminum chloride to said mixture under superatmospheric pressure sufficient to prevent substantial sublimation of said aluminum chloride.

11. A process for the manufacture of composite granular materials applicable to catalyzing organic reactions which comprises saturating a granular activated carbon with an aqueous solution of a metal halide of relatively low activity selected from the group consisting of the halides of the alkali and alkaline earth metals, drying the mixture, and subsequently adding anhydrous aluminum chloride to said mixture at a temperature of the order of 300° C. under superatmospheric pressure sufficient to prevent substantial sublimation of said aluminum chloride.

12. A process for the manufacture of composite granular materials applicable to catalyzing organic reactions which comprises saturating a granular adsorbent with an aqueous solution of a metal halide of relatively low activity selected from the group consisting of the halides of the alkali and alkaline earth metals, drying the mixture, and subsequently adding anhydrous aluminum chloride to said mixture under superatmospheric pressure sufficient to prevent substantial sublimation of said aluminum chloride.

13. A process for the manufacture of composite granular materials applicable to catalyzing organic reactions which comprises saturating a granular adsorbent with an aqueous solution of a metal halide of relatively low activity selected from the group consisting of the halides of the alkali and alkaline earth metals, drying the mixture, and subsequently adding anhydrous aluminum chloride to said mixture at a temperature of the order of 300° C. under a superatmospheric pressure sufficient to prevent substantial sublimation of said aluminum chloride.

VLADIMIR IPATIEFF.
HERMAN PINES.